United States Patent
Ren

(10) Patent No.: US 8,521,233 B2
(45) Date of Patent: Aug. 27, 2013

(54) SYSTEM AND METHOD FOR PROCESSING A CALL REQUEST

(75) Inventor: Kai-Sheng Ren, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 105 days.

(21) Appl. No.: 13/097,068

(22) Filed: Apr. 29, 2011

(65) Prior Publication Data

US 2012/0220270 A1    Aug. 30, 2012

(30) Foreign Application Priority Data

Feb. 28, 2011    (CN) .......................... 2011 1 0047551

(51) Int. Cl.
*H04M 1/00*    (2006.01)
(52) U.S. Cl.
USPC ....... 455/567; 455/550.1; 455/418; 379/67.1; 709/207

(58) Field of Classification Search
USPC ................... 455/567, 550.1, 418; 379/67.1; 709/207
See application file for complete search history.

(56) References Cited

U.S. PATENT DOCUMENTS

| | | | |
|---|---|---|---|
| 8,116,439 B1 * | 2/2012 | Runcie | 379/88.12 |
| 2007/0005157 A1 * | 1/2007 | Tanimoto | 700/65 |
| 2008/0056454 A1 * | 3/2008 | Lahtiranta et al. | 379/67.1 |
| 2009/0198786 A1 * | 8/2009 | Iemura | 709/207 |

* cited by examiner

*Primary Examiner* — Danh Le
(74) *Attorney, Agent, or Firm* — Altis Law Group, Inc.

(57) ABSTRACT

A call request processing system includes a monitoring module, a call alert module and a keyboard. The monitoring module receives a call request from a calling party and generates a corresponding call alert message. The call alert module receives and processes the call alert message, and the keyboard receives different key inputs. The call alert module processes the call alert message to generate corresponding alert information to inform the called party to respond to the call request. The keyboard receives different key inputs to access and query corresponding operation instructions, and the called party replies and responds to the call request from the calling party according to the operation instructions.

4 Claims, 4 Drawing Sheets

| | |
|---|---|
| *XX* | The called party (e.g., electronic device 1) is on busy line, and the call is estimated to substantially continue XX minutes |
| ** | The call party is on busy line, and please try again later |
| *XX# | The called party is on busy line, and the call is estimated to substantially continue XX minutes and the called party will call back to the calling party |
| *# | The called party is on busy line and will call back to the calling party later |

FIG. 2

SYSTEM AND METHOD FOR PROCESSING A CALL REQUEST

BACKGROUND

1. Technical field

The disclosure generally relates to wireless communication technology, and more particularly to a call request processing system and a method for processing a call request.

2. Description of the Related Art

When a called party is on the phone, such as a mobile phone, with another caller, the calling party cannot get through to the called party, and the called party is unable to know and obtain the call request from the calling party in time. Moreover, although another calling party knows that the called party is in call state via a busy tone of the called party, it is difficult for the calling party to know when the call will end. Thus, the calling party needs to continue to call and dial the called party to establish communication as soon as possible, resulting in time and power consumption.

Therefore, there is room for improvement within the art.

BRIEF DESCRIPTION OF THE DRAWINGS

Many aspects of an exemplary system and method for processing a call request can be better understood with reference to the following drawings. The components in the drawings are not necessarily drawn to scale, the emphasis instead being placed upon clearly illustrating the principles of the exemplary system and method for processing a call request. Moreover, in the drawings, like reference numerals designate corresponding parts throughout the several views. Wherever possible, the same reference numbers are used throughout the drawings to refer to the same or like elements of an embodiment.

FIG. 2 is a schematic diagram of a call state table including key inputs and corresponding operation instructions stored in the storage device as shown in FIG. 1.

DETAILED DESCRIPTION

Figure 1:
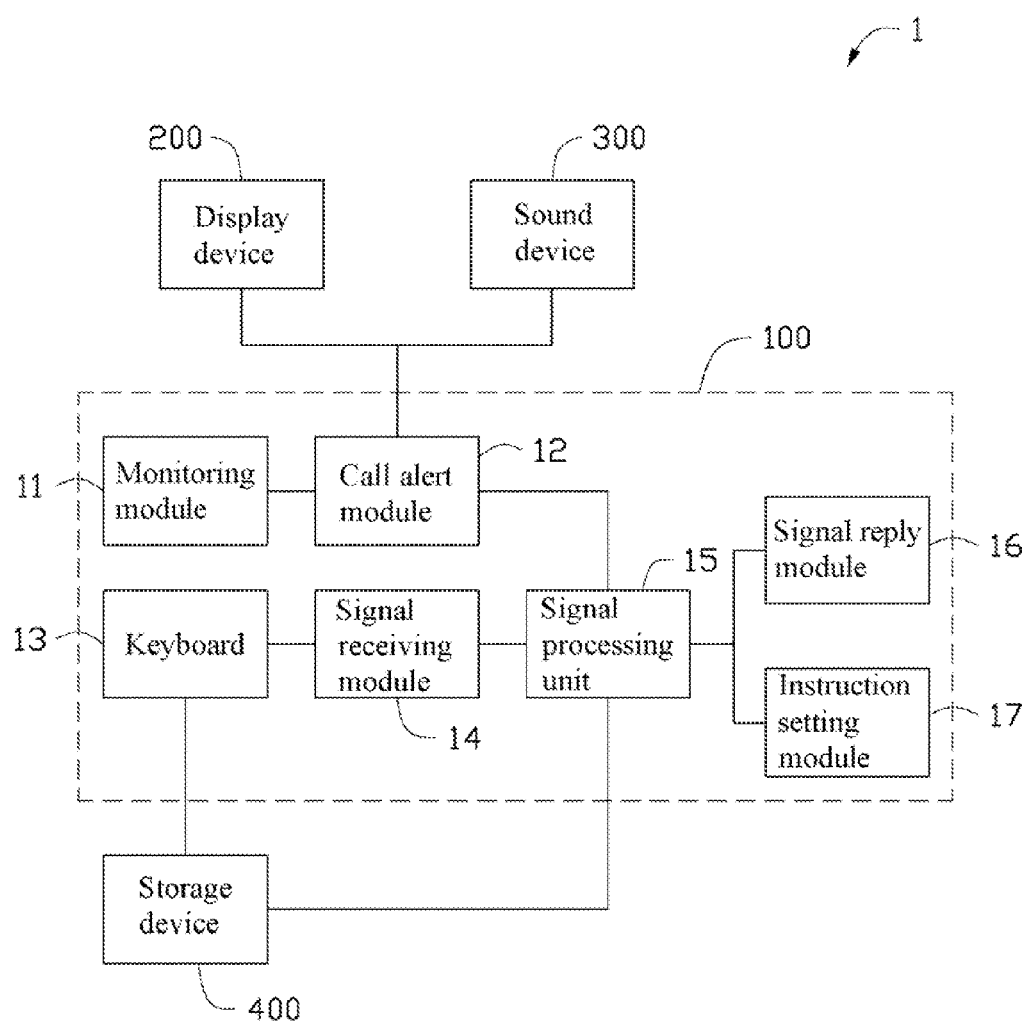
FIG. 1 is a block view of a call request processing system including a storage device used for an electronic device, according to an exemplary embodiment of the disclosure.

FIG. 1 shows a block view of a call request processing system 100 used in an electronic device 1, according to an exemplary embodiment of the disclosure. The electronic device 1 can be a mobile phone, and includes a display device 200, a sound device 300, and a storage device 400. The call request processing system 100 is in electronic communication with the display device 200, the sound device 300 and the storage device 400. The electronic device 1 can be used as a called party or a calling party to receive or send call requests. In this exemplary embodiment, the electronic device 1 is implemented as a called party to receive calls.

The display device 200 can be a liquid crystal display (LCD) or a touch screen, and is for outputting and displaying different output information, such as short messages, still images and audio signals. The sound device 300 can be a loudspeaker or headphone, and outputs different audio signals. The storage device 400 is for storing a call state table including key inputs and corresponding operation instructions from the call request processing system 100. In this exemplary embodiment, the storage device 400 can be a memory card of the electronic device 1, and can also be an external card, such as a smart media card, a compact flash card, a multi media card, a memory stick, or an extreme digital card.

The call request processing system 100 includes a monitoring module 11, a call alert module 12, a keyboard 13, a signal receiving module 14, a signal processing unit 15, a signal reply module 16, and an instruction setting module 17. The modules 11, 12, 14, and 16 may comprise one or more computerized code stored in a storage system and executed by a processor of the electronic device 1. The monitoring module 11 is for monitoring call requests from a calling party such as a mobile phone. For example, when the monitoring module 11 receives a call request from a calling party, and the electronic device 1 is communicating with another caller (e.g., a mobile phone), the monitoring module 11 generates a corresponding call alert message, and transmits the call alert message to the call alert module 12.

The call alert module 12 is electrically connected to the display device 200, the sound device 300, the monitoring module 11, and the signal processing unit 15. The call alert module 12 is for receiving and processing call alert messages from the monitoring module 11 to convert the call alert message into corresponding audio and/or video information including caller identification (ID), and calling time. The audio and/or video information is displayed by the display device 200 or is played out through the sound device 300 to inform the called party to receive and respond to the call request.

Referring to FIG. 2, the keyboard 13 can be integrated with a keypad of the electronic device 1, and is in electronic communication with the storage device 400. The keyboard 13 is for receiving different key inputs to query corresponding operation instructions in the call state table. For example, when the electronic device 1 receives a call request from a calling party, the keyboard 13 is implemented to input and transmit a corresponding key input to reply an operation instruction to the calling party. In detail, a plurality of key inputs corresponding to operation instructions can be set and input by the keyboard 13. For example, the key input *XX* represents an operation instruction that the electronic device 1 (e.g., the called party) is on a busy line and the call is estimated to substantially continue XX minutes. The key input *XX# represents an operation instruction that the call is estimated to substantially continue XX minutes and the electronic device 1 will call back to the calling party later. The key input *# represents an operation instruction that the called party is on a busy line and will call back to the calling party later. The key input *XX# represents an operation instruction that the called party is on a busy line, and the call is estimated to substantially continue XX minutes and the called party will call back to the calling party.

The signal receiving module 14 is in electronic communication with the keyboard 13, and is for receiving the key inputs from the keyboard 13 and transmitting the key input to the signal processing unit 15 to query the call state table in the storage device 400. The signal processing unit 15 can be a central processing unit (CPU) of the electronic device 1, and carries out each key input of the electronic device 1 in sequence, to perform the basic arithmetical, logical and input/output operations. In this exemplary embodiment, the signal processing unit 15 is for receiving the key inputs from the signal receiving module 14, and accessing and querying operation instructions corresponding to the key inputs in the call state table of the storage device 400. The signal processing unit 15 is also for controlling the signal reply module 16 and the instruction setting module 17 according to the operation instructions.

The signal reply module 16 is in electronic communication with the signal processing unit 15, and is for receiving the operation instructions from the signal processing unit 15 and transmitting the operation instructions to the calling party to reply and inform the calling party the current call state of the called party. For example, when the signal processing unit 15 receives a key input *XX*, the signal processing unit 15 then accesses and queries a corresponding operation instruction (e.g., the electronic device 1 is on a busy line and the call is estimated to substantially continue XX minutes) in the call state table. In addition, the signal reply module 16 transmits the operation instruction to inform the calling party.

The instruction setting module 17 is in electronic communication with the signal reply module 16 and the signal processing unit 15. The instruction setting module 17 is for receiving the operation instructions and setting corresponding callback information, such as callback time, callback mode including vibration, message and ring tone, according to the operation instructions. For example, when the instruction setting module 17 receives an operation instruction (e.g., the electronic device 1 will call back to the calling party XX minutes later), a predetermined callback information is set by the instruction setting module 17, for example, a callback time such as five minutes after the call is input by the instruction setting module 17. Thus, when the predetermined callback time ends, the instruction setting module 17 reminds, by way of ring tone, vibration and/or message, the called party whether to call back or reply to the calling party or not.

Figure 3:
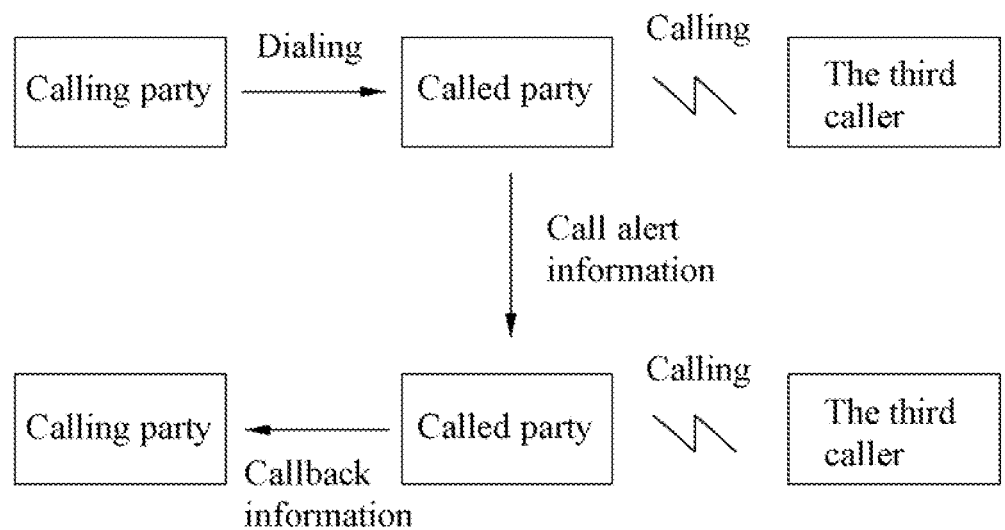
FIG. 3 is a schematic application view of the call request processing system as shown in FIG. 1.
Figure 4:
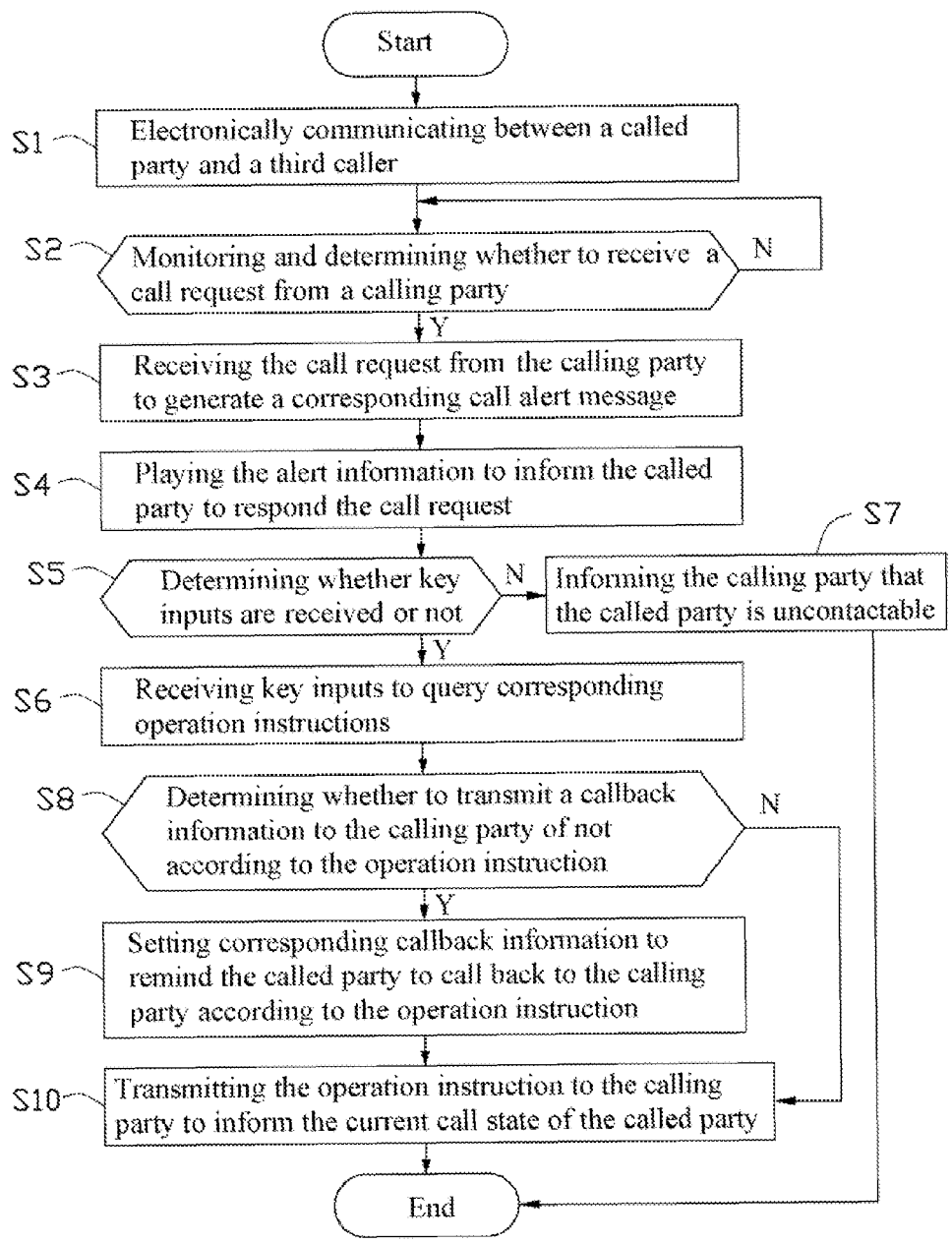
FIG. 4 is a flowchart of a method for processing a call request, according to an exemplary embodiment of the disclosure.

Also referring to FIGS. 3 and 4, a method for processing a call request according to an exemplary embodiment of the disclosure is depicted. The method can use the aforementioned call request processing system 100 to process and manage a call request, and may include at least the following steps.

In step S1, a called party (e.g., the electronic device 1) is busy, that is the called party is communicating with a third caller.

In step S2, the monitoring module 11 of the call request processing system 100 monitors and determines whether to receive a call request from a calling party. If the monitoring module 11 receives a call request from the calling party, the monitoring module 11 generates a corresponding call alert message and transmits the call alert message to the call alert module 12, then goes to step S3; if the monitoring module 11 fails to receive the call request from the calling party, then it repeats step S2.

In step S3, the call alert module 12 receives and processes the call alert message from the monitoring module 11 to generate corresponding audio and/or video alert information, such as caller ID and calling time.

In step S4, the alert information including caller ID and calling time is output and displayed by the display device 200 or is played out through the sound device 300 to inform the called party to receive and respond to the call request. For example, the call alert module 12 converts the call alert message into audio and/or video information including caller ID and calling time, and the audio and/or video information is displayed by the display device 200 or is played out through the sound device 300 to inform the called party to respond the call request timely.

In step S5, the signal receiving module 14 determines whether the keyboard 13 sets and receives corresponding key inputs of the called party. If the signal processing module 14 receives the key inputs from the keyboard 13, the key inputs are transmitted to the signal processing unit 15, and then it goes to step S6; if the signal processing module 14 fails to receive the key inputs from the keyboard 13, then it goes to step S7.

In step S6, the signal processing unit 15 receives the key inputs from the signal receiving module 14, and accesses and queries corresponding operation instructions in a call state table of the storage device 400.

In step S7, the signal receiving module 14 informs the calling party that the called party is in a disconnected state or on a busy line through a reply message, then it goes to the end.

In step S8, the signal processing unit 15 determines whether to transmit a callback information to the calling party or not according to the operation instructions. If the signal processing unit 15 controls the instruction setting module 17 to send callback information to the calling party according to the operation instructions, then it goes to step S9; if the signal processing unit 15 fails to control the instruction setting module 17 to send callback information to the calling party, then it goes to step S10.

In step S9, the instruction setting module 17 receives the operation instruction from the signal processing unit 15 and sets corresponding callback information including callback time, callback mode such as vibration, message and ring tone to remind the called party to call back or reply the calling party.

In step S10, the signal reply module 16 receives the operation instruction from the signal processing unit 15 and transmits the operation instruction to the calling party to reply and inform the calling party the current call state of the called party.

In summary, the call request processing system 100 is used in the electronic device 1 implemented as a called party. Even if the electronic device 1 is communicating with another caller, the electronic device 1 can still receive and obtain a call request from the a calling party without interruption of the current call to respond to the calling party in a timely manner. In addition, the called party can also reply to the calling party using predetermined callback information; therefore, the calling party can obtain a detailed call state according to the callback information, such as substantial end time of the call, callback time, and call time. Thus, the electronic device 1 can establish communication with the calling party as soon as possible.

In the present specification and claims the word "a" or "an" preceding an element does not exclude the presence of a plurality of such elements. Further, the word "comprising" does not exclude the presence of other elements or steps than those listed.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in matters of shape, size, and arrangement of parts within the principles of exemplary disclosure to the full extent indicated by the broad general meaning of the terms in which the appended claims are expressed.

What is claimed is:
1. A call request processing system, comprising:
    a monitoring module that receives a call request from a calling party and generates a corresponding call alert message;
    a call alert module that receives and processes the call alert message;
    a keyboard;

a signal receiving module electrically connected to the keyboard;

a signal processing unit electrically connected to the call alert module and the signal receiving module;

a signal reply module electrically connected to the signal processing unit; and an instruction setting module electrically connected to the signal processing unit and the signal reply module;

wherein when the monitoring module receives the call request from the calling party, and the called party is communicating with another caller, the call alert module processes the call alert message to generate a corresponding alert information to inform a called party to respond to the call request from the calling party, the keyboard receives different key inputs to access and query corresponding operation instructions to represent a current call state of the called party, and the called party replies and informs the calling party the current call state of the called party according to the operation instructions; and wherein when the monitoring module receives the call request from the calling party, the keyboard receives corresponding key inputs to access and query corresponding operation instructions in a call state table built in a storage device to respond or call back to the calling party; and wherein the signal receiving module receives and transmits the key inputs, the signal processing unit carries out each key input of the called party in sequence, and receives the key inputs from the signal receiving module and accesses querying operation instructions corresponding to the key inputs in the call state table, the signal reply module receives the operation instruction from the signal processing unit and transmits the operation instruction to the calling party to reply and inform the calling party the current call state of the called party, and the instruction setting module receives the operation instruction and sets corresponding callback information comprising callback time, callback mode including vibration, message and ring tone according to the operation instruction.

2. The call request processing system as claimed in claim 1, wherein the monitoring module generates a corresponding call alert message and transmits the call alert message to the call alert module, the call alert module convert the call alert message into corresponding audio and/or video information, the audio and/or video information is displayed by a display device or is played out through a sound device to inform the called party to respond to the call request.

3. The call request processing system as claimed in claim 1, wherein when the instruction setting module receives an operation instruction, a predetermined callback time is set by the instruction setting module, when the predetermined callback time ends, the instruction setting module reminds the called party to call back or reply to the calling party.

4. A call request processing system used in a called party communicating with a third caller, comprising:

a monitoring module that receives a call request from a calling party and generates a corresponding call alert message;

a call alert module that receives and processes the call alert message;

a keyboard;

a signal processing unit that electrically connected to the keyboard and the call alert module;

a signal reply module electrically connected to the signal processing unit; and an instruction setting module electrically connected to the signal processing unit and the signal reply module;

wherein the call alert module converts the call alert message to generate a corresponding alert information to inform the call request from the calling party is received, the keyboard receives different key inputs, and the signal processing unit access and search corresponding operation instructions in a call state table, and the called party transmits the operation instruction to the calling party or replies a callback to the calling party according to the operation instruction, the signal reply module receives the operation instruction from the signal processing unit and transmits the operation instruction to the calling party to reply and inform the calling party the current call state of the called party, the instruction setting module receives the operation instruction and sets corresponding callback information comprising callback time, callback mode including vibration, message and ring tone according to the operation instruction.

* * * * *